United States Patent
Zhu et al.

(10) Patent No.: US 10,594,406 B2
(45) Date of Patent: Mar. 17, 2020

(54) PILOT-AIDED DIGITAL SIGNAL PROCESSING FOR RECEPTION OF COHERENT OPTICAL COMMUNICATION

(71) Applicant: Nokia Solutions and Networks Oy, Espoo (FI)

(72) Inventors: Chen Zhu, Edison, NJ (US); Noriaki Kaneda, Westfield, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/916,607

(22) Filed: Mar. 9, 2018

(65) Prior Publication Data
US 2019/0280778 A1    Sep. 12, 2019

(51) Int. Cl.
*H04B 10/06* (2006.01)
*H04B 10/61* (2013.01)
*H04B 10/69* (2013.01)

(52) U.S. Cl.
CPC ....... *H04B 10/612* (2013.01); *H04B 10/6164* (2013.01); *H04B 10/6165* (2013.01); *H04B 10/6971* (2013.01)

(58) Field of Classification Search
CPC .............. H04B 10/612; H04B 10/6164; H04B 10/6165; H04B 10/6971; H04B 10/616; H04B 10/60; H04B 10/611; H04B 10/6162; H04B 10/61; H04B 10/0775
USPC ........... 398/202, 208–211, 204, 205, 206, 25
See application file for complete search history.

(56) References Cited

U.S. PATENT DOCUMENTS

| | | | |
|---|---|---|---|
| 6,850,557 B1 * | 2/2005 | Gronemeyer | G01S 19/235 342/357.63 |
| 7,894,325 B2 | 2/2011 | Chadha et al. | |
| 8,301,037 B2 | 10/2012 | Pfau | |
| 8,340,222 B2 | 12/2012 | Arambepola et al. | |
| 8,855,501 B2 * | 10/2014 | Xie | H04B 10/60 398/202 |

(Continued)

OTHER PUBLICATIONS

Guiomar et al.; "Fully Blind Linear and Nonlinear Equalization for 100G PM-6QAM Optical Systems"; Journal of Lightwave Technology; vol. 33; No. 7; Apr. 1, 2015; 10 pgs.

(Continued)

*Primary Examiner* — Hibret A Woldekidan
(74) *Attorney, Agent, or Firm* — Chiesa Shahinian & Giantomasi PC

(57) ABSTRACT

Pilot-aided digital coherent reception of high-order QAM signal detection using a continuous short pilot preamble and subsequent pilot symbols that are periodically distributed with payload data resulting in low-complexity and fast-convergence signal detection for continuous mode coherent reception of high-order QAM signals. A digital signal processor is configured to demodulate a transmitted data stream from digital stream of measurements of light mixtures produced in a receiver for coherent optical communications in response to receiving modulated optical carriers. The digital signal processor includes one circuit stage for providing corrections to the digital stream to compensate first effects on the light mixtures due to a frequency shift of a local optical oscillator of the receiver and another circuit stage for correcting the digital stream to compensate for second effects on the light mixtures due to polarization dependent channel modification of the modulated optical carriers.

20 Claims, 8 Drawing Sheets

(56) References Cited

U.S. PATENT DOCUMENTS

| | | | |
|---|---|---|---|
| 8,929,750 B2* | 1/2015 | Ishihara | H04B 10/07951 398/202 |
| 8,983,289 B2 | 3/2015 | Zhou | |
| 9,419,724 B2* | 8/2016 | Shibutani | H04B 10/611 |
| 9,520,947 B2* | 12/2016 | Ishihara | H04B 10/07951 |
| 9,559,786 B2 | 1/2017 | Millar et al. | |
| 9,614,621 B2* | 4/2017 | Ishihara | H04B 10/07951 |
| 9,692,548 B2 | 6/2017 | Jia et al. | |
| 9,722,697 B2* | 8/2017 | Ogasahara | H04J 14/06 |
| 2009/0196602 A1* | 8/2009 | Saunders | H04B 10/5053 398/26 |
| 2012/0087680 A1* | 4/2012 | Xie | H04B 10/60 398/208 |
| 2013/0216240 A1* | 8/2013 | Fukuchi | H04B 10/6161 398/208 |
| 2016/0308579 A1* | 10/2016 | Abe | H04B 3/06 |
| 2018/0034552 A1* | 2/2018 | Oyama | H04J 14/06 |
| 2018/0069626 A1* | 3/2018 | Zhao | H04B 10/616 |

OTHER PUBLICATIONS

Louchet et al.; "Improved DSP Algorithms for Coherent 16-QAM Transmission"; ECOC 2008; Sep. 21-25; 2008; Brussels, Belgium; 2 pgs.

Pfau et al.; Hardware-Efficient Coherent Digital Receiver Concept with Feedforward Carrier Recovery for M-QAM Constellations; Journal of Lightwave Technology; vol. 27; No. 8; Apr. 15, 2009; 11 pgs.

Nakagawa et al., "Non-Data-Aided Wide-Range Frequency Offset Estimator for QAM Optical Coherent Receivers"; 2011; IEEE; Los, Angeles, CA; 3 pgs.

Pajovic et al., Experimental Demonstration of Multi-Pilot Aided Carrier Phase Estimation for DP-64QAM and DP-256QAM; 2015; ECOC, Valencia, Spain; 3 pgs.

Fatadin et al., "Laser Linewidth Tolerance for 16-QAM Coherent Optical Systems using QPSK Partitioning," IEEE Photonics Technolology Letters, May 1, 2010, vol. 22, No. 9, pp. 631-633.

Bilal et al., "Dual Stage CPE for 64-QAM Optical Systems Based on a Modified QPSK-Partitioning Algorithm," IEEE Photonics Technolology Letters, Feb. 1, 2014, vol. 26, No. 3, pp. 267-270.

Zhang et al., "Decision-Aided Carrier Phase Estimation for Coherent Optical Communications," Journal of Lightwave Technololgy, Jun. 1, 2010, vol. 28, No. 11, pp. 1597-1607.

Choi et al., "Frame Synchronization in the Presence of Frequency Offset," IEEE Transactions on Communications, Jul. 2002, vol. 50, No. 7, pp. 1062-1065.

Zhu et al., "Discrete Cosine Transform based Pilot-Aided Phase Noise Estimation for High-Order QAM Coherent Optical Systems," Optical Fiber Communication Conference, OSA Technical Digest (online) (Optical Society of America, 2017), paper Th4C.1.

Thomsen et. al., "Burst Mode Receiver for 112 Gb/s DP-QPSK with parallel DSP," Optics Express, Dec. 6, 2011, vol. 19, No. 26, pp. B770-B776.

Vacondio et al., "Flexible TDMA Access Optical Networks Enabled by Burst-Mode Software Defined Coherent Transponders," 39th European Conference and Exhibition on Optical Communication, 2013, paper We.1.F.2, 3 pgs.

Simsarian et.al, "Fast-tuning 224-Gb/s Intradyne Receiver for Optical Packet Networks," National Fiber Optic Engineers Conference, 2010 IEEE Communications Society, IEEE Photonics Society, OSA, paper PDPB5, 3 pgs.

Li et. al., "A 100-Gb/s Realtime Burst-Mode Coherent PDM-DQPSK Receiver," 39th European Conference and Exhibition on Optical Communication, 2013, PD2.D.4, 3 pgs.

Roman Dischler, "Experimental Comparison of 32- and 64-QAM Constellation Shapes on a Coherent PDM Burst mode tapable system," 37th European Conference and Exposition on Optical Communications, OSA Technical Digest (CD) (Optical Society of America, 2011), paper Mo.2.A.6, 3 pgs.

Mengali et al., "Data-Aided Frequency Estimation for Burst Digital Transmission," IEEE Transactions on communications, vol. 45, No. 1, Jan. 1997, pp. 23-25.

M. Golay, "Complementary Series," IRE Transactions on Information Theory, vol. 7, Issue 2, Apr. 1961, pp. 82-87.

\* cited by examiner

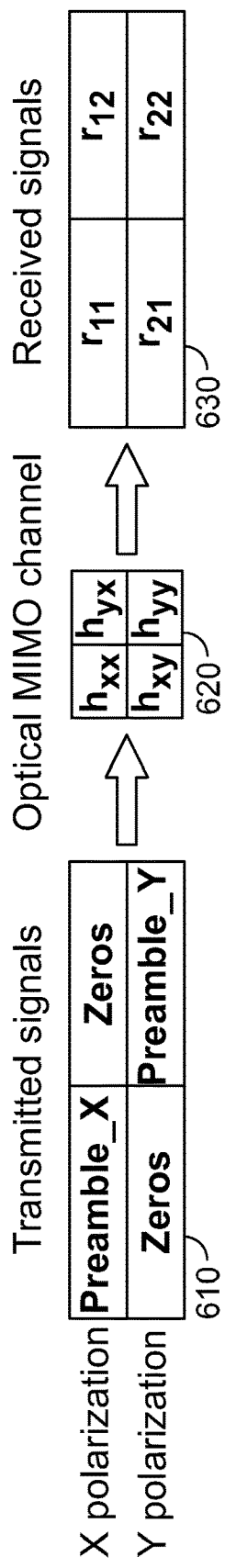

Preamble_X = $\mathbf{S_x}$, a pilot preamble on X-polarization with length K.
Preamble_Y = $\mathbf{S_y}$, a pilot preamble on Y-polarization with length K.
Zeros = $\mathbf{0}$, a length-K sequence with all zeros. i.e. 0 0 0 0 0 0 ...... 0
$\mathbf{h_{xx}}$, $\mathbf{h_{yx}}$, $\mathbf{h_{xy}}$, $\mathbf{h_{yy}}$ stands for MIMO optical channel, each with length N+1.
$\mathbf{r_{11}} = \mathbf{S_x} * \mathbf{h_{xx}}$, $\mathbf{r_{12}} = \mathbf{S_y} * \mathbf{h_{yx}}$, $\mathbf{r_{21}} = \mathbf{S_x} * \mathbf{h_{xy}}$, $\mathbf{r_{22}} = \mathbf{S_y} * \mathbf{h_{yy}}$. * stands for linear convolution
$\mathbf{r_{11}}$, $\mathbf{r_{12}}$, $\mathbf{r_{21}}$, $\mathbf{r_{22}}$ are all K-length sequences.

Note: in the above, bold face letter stands for vector, i.e. not a single element

FIG. 6

PILOT-AIDED DIGITAL SIGNAL PROCESSING FOR RECEPTION OF COHERENT OPTICAL COMMUNICATION

TECHNICAL FIELD

The present invention relates generally to coherent optical communication.

BACKGROUND OF THE INVENTION

Today, in the Internet era, the popularity of multimedia communications services continues to grow at extraordinary rates and provides users with a variety of platforms to access content. Consequently, the demand for increased capacity in communications networks (e.g., core data transport networks) continues to grow to enable and maintain the user experience at the highest levels. For service providers, core data transport networks are optical networks based on fiber-optic technologies. For example, QAM is a well-known advanced signal modulation technique that increases the capacity of optical networks.

Coherent optical detection is another well-known technique that is useful for detecting and demodulating received optical signals transmitted across optical networks. For example, coherent detection with digital signal processing (DSP) not only enables the deployment of complex modulation formats and polarization-division-multiplexing (PDM) that dramatically enhances per-channel capacity, but also provides wavelength selectivity features.

Therefore, a need exists for an improved channel and carrier recovery scheme that achieves increased overall processing performance and reduced hardware configuration complexity.

BRIEF SUMMARY OF EMBODIMENTS

In accordance with various embodiments, a pilot-aided technique for digital coherent reception of high-order QAM signal detection is provided using a continuous short pilot preamble (e.g., 32 symbols) and subsequent pilot symbols that are periodically distributed with payload data resulting in low-complexity and fast-convergence signal detection, and which can be implemented for continuous mode coherent reception of high-order QAM signals.

In accordance with the embodiments, a full DSP architecture and operations for each DSP sub-system are provided for coherent optical communications applications with large constellations (e.g., QAM). The utilization of pilots provides an improved starting point for compensating for the frequency shift between a local oscillator of a receiver and a laser of a transmitter in the optical network. Further, the starting point for determining how to remove channel degradation related to polarization, i.e., roughly by inverting the channel matrix iteratively, is also improved. The frame synchronization, coarse frequency offset estimation and initial MIMO channel estimation are all completed with one continuous short pilot preamble (i.e., 32 symbols), and subsequent pilot symbols that are periodically distributed with the payload data (distributed pilot symbols to payload data overhead is less than 3%) can help the DSP system achieving optimal convergence.

In accordance with an embodiment, the transmitter DSP structure and operations provide for each burst that is a pilot sequence of a designated length. A transmit matrix is formed such that the preamble(s) are transmitted as single-polarization signals, and each data frame contains a particular number of pilot symbols to facilitate optimal convergence of adaptive filtering and fine frequency offset estimation and recovery.

Similarly, in accordance with an embodiment, the receiver DSP structure and associated operations begins with the received preamble matrix for frame and frequency synchronization. The received signals are formalized and double correlated with the transmitted preamble. The resulting polarizations are superimposed where the maximum peak indicates the starting point of the preamble. After locating the received preamble, in accordance with the embodiment, coarse synchronization is conducted and channel response impairment is estimated and taken into account employing a lag factor. Frequency offset is estimated using, illustratively, only elements related to the amplitude of the channel impulse response thereby facilitating such frequency offset estimation without knowledge of the channel parameters.

After such frequency offset estimation, in accordance with an embodiment, the preambles are extracted and utilized for setting up initial MIMO adaptive filter coefficients. After adaptive filtering takes place, the frequency offset can be fine-tuned by equal-distanced pilot symbols, and phase noise is finally recovered based on a discrete cosine transform (DCT) low-pass filter model, using the same distributed pilot symbols. The initial channel estimation is achieved using the MIMO preamble matrix based on least squares estimation, and then the adaptive filter coefficients are set accordingly, as detailed above.

The optimal convergence of the adaptive filter is achieved based on multi-modulus algorithm (MMA) criteria using the distributed pilot symbols. The distributed pilot symbols are used to fine tune the frequency offset by averaging the phase difference of neighboring symbols to ultimately achieve the pilot-aided DCT based noise estimation. Further, in accordance, with an embodiment, the phase noise recovery can be processed iteratively based on a space-alternating generalized expectation-maximization (EM) method for performance optimization.

Illustratively, in an embodiment, a digital signal processor is configured to demodulate a transmitted data stream from digital stream of measurements of light mixtures produced in a receiver for coherent optical communications in response to receiving modulated optical carriers. The digital signal processor includes one circuit stage for providing corrections to the digital stream to compensate first effects on the light mixtures due to a frequency shift of a local optical oscillator of the receiver and another circuit stage for correcting the digital stream to compensate for second effects on the light mixtures due to polarization dependent channel modification of the modulated optical carriers. The circuit stages are configured to estimate initial ones of the corrections to the data stream to compensate for the first and second effects based on one or more segments of the digital stream corresponding to predefined optical pilot symbols received by the receiver.

These and other advantages will be apparent to those of ordinary skill in the art by reference to the following detailed description and the accompanying drawings.

BRIEF DESCRIPTION OF THE DRAWINGS

FIG. 6 is an illustrative example of a received signal matrix in accordance with an embodiment.

DETAILED DESCRIPTION

In accordance with various embodiments, a pilot-aided technique for digital coherent reception of high-order QAM signal detection may be, e.g., provided using, e.g., a continuous pilot preamble (e.g., a short preamble of 32 symbols) and subsequent pilot symbols that may be, e.g., distributed with payload data resulting in low-complexity signal detection, and which can be implemented for continuous mode coherent reception of QAM signals.

Figure 1:
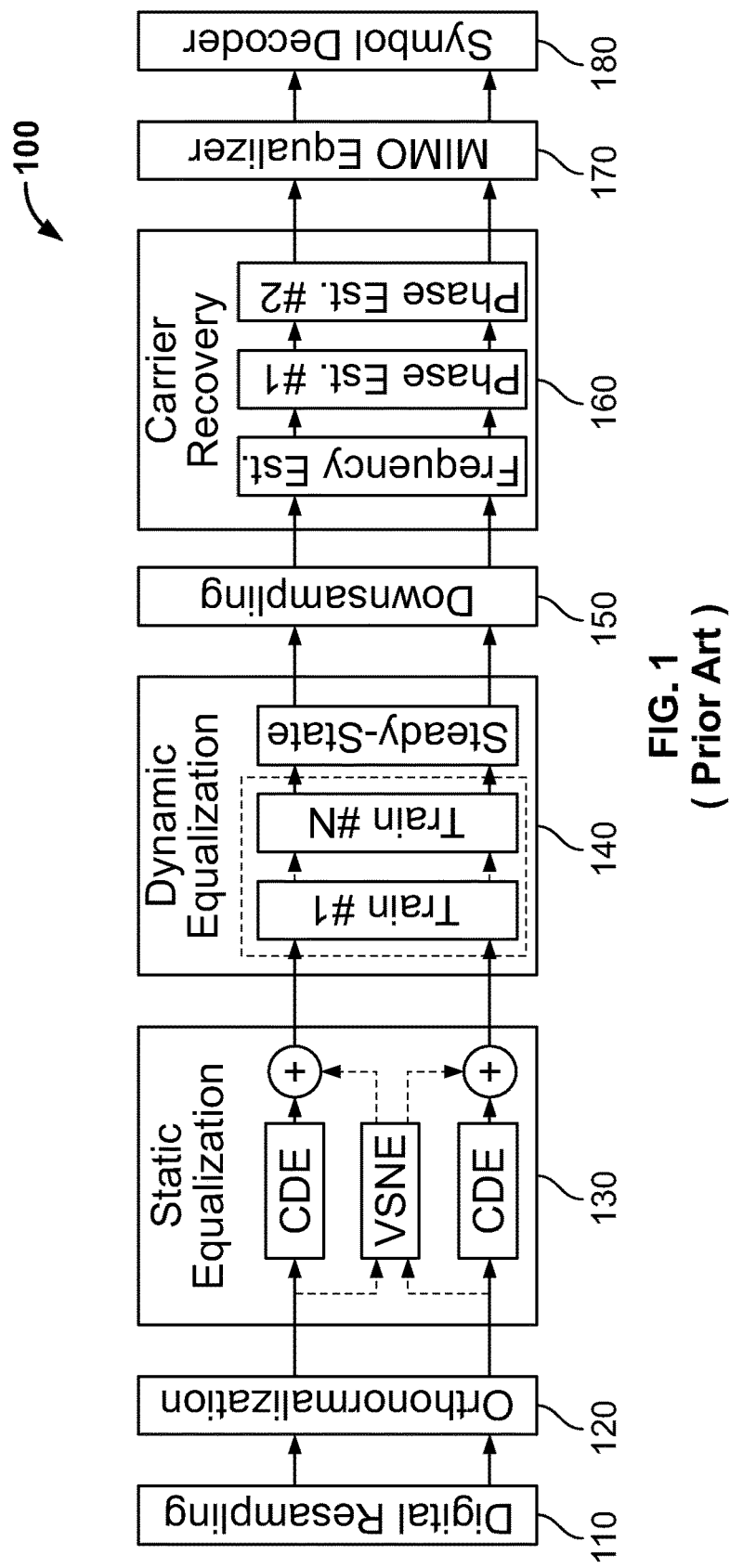
FIG. 1 shows an illustrative prior art sequence of DSP subsystems for processing QAM received signals.

FIG. 1 shows an illustrative prior art sequence of DSP subsystems for processing QAM received signals. As shown, in DSP sequence 100, the first subsystem (i.e., subsystem 110) consists of a resampling stage which is followed by subsystem 120 which is a ortho-normalization procedure to normalize the signal and compensate for quadrature imbalance in the optical front-end of a coherent optical receiver. In subsystems 130 and 140, the equalization of static fiber impairment (i.e., chromatic dispersion and fiber non-linearity) is addressed (e.g., using independent CD equalizers (CDE) in parallel with a Volterra series nonlinear equalizer (VSNE)) together with dynamic equalization to apply joint compensation for optical linear and nonlinear impairments. The equalized signal is then, in subsystem 150, down-sampled and provided to subsystem 160 which is a carrier recovery block in which frequency estimation is performed (e.g., using a fourth power spectral method). Phase estimation, in subsystem 160, is performed in two non-data aided (NDA) stages, for example the first NDA stage is based on a fourth power Viterbi-Viterbi algorithm performed over 64QAM symbols. The second NDA stage involves a decision-directed (DD) maximum likelihood phase estimation which feeds into subsystem 180 for symbol decoding and bit error counting. From the phase estimation, an MIMO equalizer is applied, e.g., to compensate or undue polarization-dependent optical fiber channel effects such as polarization rotation and polarization mode dispersion, in subsystem 170, and symbol decoding is performed in subsystem 180. As noted previously, this type of DSP processing is effective but has a complex hardware configurations, and may face significant processing challenges for higher-order (>64) QAM modulation formats.

Figure 2:
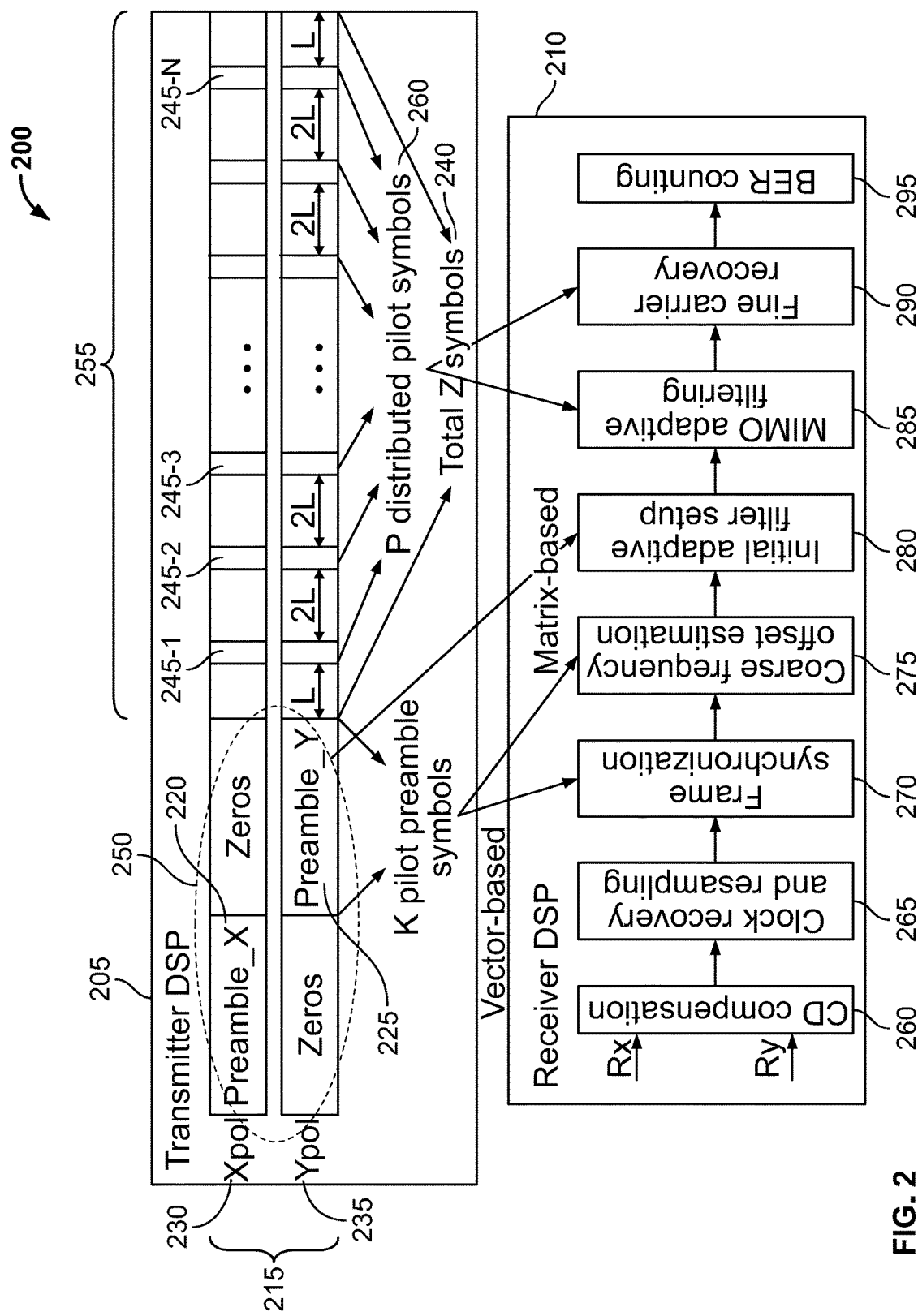
FIG. 2 shows block diagram of an illustrative DSP architecture and operations in accordance with an embodiment.

FIG. 2 shows an illustrative DSP architecture 200 for a paired coherent optical transmitter and coherent optical receiver communication via an optical fiber line. FIG. 2 also shows operations of the DSP architecture 200, which is pilot-aided, in accordance with an embodiment. The coherent optical transmitter includes a transmitter DSP subsystem 205, which drives optical modulators therein to transmit a sequence of optical symbols to the remote coherent optical receiver via an optical fiber line. The coherent optical receiver includes a receiver DPS subsystem 210 uses pilot symbols transmitted by the coherent optical transmitter to aid in demodulating the data sequence optically transmitted thereto by the coherent optical receiver. The pilots may include a continuous preamble, e.g., a sequence whose consecutive symbols are pilot symbols, and distributed pilot symbols. Here, the pilot symbols and data symbols may be coded to the same optical communication constellation, e.g., N-QAM. More particularly, for each segment of the symbol stream (e.g., segment 215), there may be a pilot preamble sequence (e.g., pilot preamble 220 and pilot preamble 225) with symbol length K for both X polarization 230 and Y polarization 235, respectively, wherein the orthogonal polarization preamble sequences are located in different time slots. This forms transmit preamble matrix 250 with a configuration of: [$s_x$ 0; 0 $s_y$], such that pilot preambles 220 and 225 are transmitted as single-polarization signals, i.e., without temporal overlap.

Here, $s_x$ is the X-polarization pilot preamble symbol sequence 220, $s_x$ is the relatively orthogonal Y-polarization pilot preamble symbol sequence 225, and "0" corresponds to a vector with all elements equal to zero, i.e., K zeros (the same length as the preamble). Data frame 255 may have Z total symbols 240 that contain P distributed pilot symbols 260, where the ratio ZIP may be, e.g., equal to an odd integer: 2L+1 (L is an integer). The individual distributed pilot symbols (e.g., pilot symbols 245-1, 245-2, 245-3, through 245-N) may follow any number of well-known designs, for example, as described in C. Zhu and Noriaki Kaneda, "Discrete Cosine Transform based Pilot-Aided Phase Noise Estimation for High-Order QAM Coherent Optical Systems," OFC, pp. Th4C.1, 2017, which design has: i(2L+1)+L, i=0,1, . . . P−1, to aid the optimal convergence of adaptive filter and fine frequency offset estimation and phase recovery. The above-mentioned article of C. Zhu and N. Kaneda is incorporated herein, by reference, in its entirety.

As shown in FIG. 2, in receiver DSP 210, after certain standard processing such as front-end I/Q imbalance correction, chromatic dispersion compensation 260 and digital clock recovery 265, the subsequent DSP functions start with the received preamble matrix: [$r_{11}$ $r_{12}$; $r_{21}$ $r_{22}$] for frame synchronization 270 and coarse frequency offset synchronization 275. Illustratively, the received signals in $r_{11}$ are represented as follows:

$$r_{11}(k) = e^{j(2\pi\Delta fkT+\phi(k))}\sum_{n=0}^{N} s_x(k-n)h_{xx}(n) + n(k) \quad (1)$$

where k is variable index that corresponds to the position of this symbol in the preamble (i.e., ranges from 0 to K−1), $h_{xx}$ is the MIMO optical channel, each with length N+1, $h_{xx}$ represents N+1 taps of channel impulse response, $\Delta f$ is the frequency offset between the laser of the optical transmitter and the local optical oscillator of the optical receiver, $\phi$ is the laser phase noise and n stands for the noise term, and T is the symbol interval (i.e., 1/symbol rate).

For example, FIG. 6 is an illustrative example of a received signal matrix in accordance with an embodiment. In particular, transmitted signals 610 are shown with their respective X and Y polarization configurations through the optical MIMO channel 620 with their respective configurations, and received signals 630 with their respective configurations. Without inter-polarization crosstalk between $s_x$ and $s_y$, the frame synchronization, the receiver DSP, can be realized by a double correlation scheme that may be relatively immune to frequency offset between the lasers of the optical transmitter and the optical receiver and phase noise of said lasers. In the receiver DSP, the frame synchronization may, e.g., be defined by:

$$J_{FS}(n) = \sum_{i=1}^{K-1}\left\{\left|\sum_{k=i}^{K-1} r^*(n+k)s(k)r(n+k-i)s^*(k-i)\right| - \sum_{k=m+i}^{m+K-1}|r(k)||r(k-i)|\right\} \quad (2)$$

where [ ]* stands for the complex conjugation operation, and the subscripts (x, y) are dropped as the frame synchronization is processed on each polarization independently. In the receiver DSP, the received signals "S" are double correlated with the transmitted preamble (i.e., can be either $s_x$ or $s_y$ as detailed above in preambles 220 and 225), and the results of the two polarizations are superimposed, where the maximum peak indicates the starting point of the preamble. As will be appreciated, the double correlation detailed previously means the correlation operations is performed twice. In this way, the embodiment of the receiver DSP can synchronize with small numbers of preamble symbols (e.g., "tens" of symbols).

Figure 7:
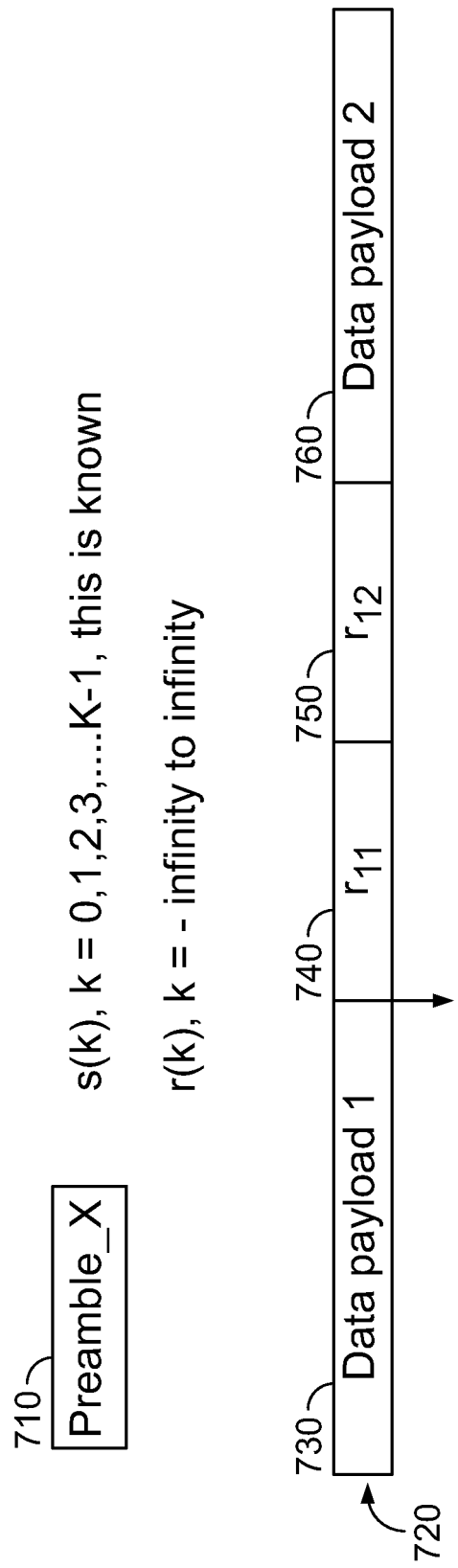
FIG. 7 is an illustrative example of frame synchronization in accordance with an embodiment.

FIG. 7 is an illustrative example of frame synchronization in accordance with an embodiment as detailed above. This illustrates the determination of the starting point (i.e., first symbol) of the received pilot preamble as achieved by the aforementioned double correlation of the received signals with the known pilot preamble on either polarization. In particular, preamble X 710 is shown with data frame 720 which comprises data payload 730, received signal 740, received signal 750, and data payload 760.

As large frequency offsets can prevent using pilot symbols directly for accurate channel estimation, after locating the received preamble, the receiver DSP can perform a coarse frequency offset synchronization with $r_{11}/r_{12}/r_{21}/r_{22}$ separately. As the received preambles are impaired by the channel response, the conventional pilot-aided frequency offset estimator is modified by taking channel response into account. From above Eq. (1), the equation with lag-factor m is constructed as follows for the coarse frequency estimation with preamble in accordance with the embodiment:

$$\eta_m(k) = r_{11}(k)r_{11}^*(k-m) = \left(\sum_{n=0}^{N}\sum_{i=0}^{N}s_x(k-n)s_x^*(k-m-i)h_{xx}(n)h_{xx}^*(i)\right)e^{j(2\pi\Delta fmT+\phi(k)-\phi(k-m))} + n_m(k) \quad (3)$$

While dealing with large frequency offsets (at least hundreds of MHz), the laser linewidth is typically considerably smaller so the phase noise term $\phi(k)-\phi(k-m)$ can be dropped, and the receiver DSP may implement a reformulation of Eq. (3) above into the following simple vector scalar-product form:

$$\eta_m(k) \approx s_{x,m}^T(k)ce^{j2\pi\Delta fmT}+n_m(k) \quad (4)$$

where [ ]$^T$ denotes matrix transpose, $s_{x,m}(k)$ and c are both vector with $(N+1)^2$ length, representing the products $s_x(k-n)s_x^*(k-m-i)$ and $h_{xx}(n)h_{xx}^*(i)$, respectively.

Combining different k values ($m+N+1\leq k\leq K$), i.e. utilizing all the preamble symbols, leads to a matrix equation as follows:

$$\eta_m \approx S_{x,m}ce^{j2\pi\Delta fmT}+n_m=S_{x,m}C+n_m \quad (5)$$

where $S_{x,m}$ is a $(K-m-N)$ by $(N+1)^2$ matrix and $C=ce^{j2\pi\Delta fmT}$. For example, with preamble length K=9, lag-factor m=5, and 2-taps channel (N=1), Eq. (5) above is formulated as:

$$\underbrace{\begin{bmatrix} r_{11}(7)r_{11}^*(2) \\ r_{11}(8)r_{11}^*(3) \\ r_{11}(9)r_{11}^*(4) \end{bmatrix}}_{\eta_m} = \underbrace{\begin{bmatrix} s_x(7)s_x^*(2), s_x(7)s_x^*(1), s_x(6)s_x^*(2), s_x(6)s_x^*(1) \\ s_x(8)s_x^*(3), s_x(8)s_x^*(2), s_x(7)s_x^*(3), s_x(7)s_x^*(2) \\ s_x(8)s_x^*(3), s_x(8)s_x^*(2), s_x(7)s_x^*(3), s_x(7)s_x^*(2) \end{bmatrix}}_{S_{x,m}} \quad (6)$$

$$\underbrace{\begin{bmatrix} |h_{xx}(0)|^2 \\ h_{xx}(0)h_{xx}^*(1) \\ h_{xx}^*(0)h_{xx}(1) \\ |h_{xx}(1)|^2 \end{bmatrix}e^{j2\pi\Delta fmT}}_{C} + n_5$$

Least square estimation of C is: $C'=(S_{x,m}^H S_{x,m})^{-1}S_{x,m}^H\eta_m$, this requires $S_{x,m}^H S_{x,m}$ to be non-singular, note that for a given preamble, $(S_{x,m}^H S_{x,m})^{-1}S_{x,m}^H$ can be pre-calculated to reduce the implementation complexity. The receiver DSP can estimate the frequency offset of the optical transmitter laser and optical receiver laser by using the elements that only relate to the amplitude of the channel impulse response ($|h|^2$), i.e. $C'(1)$ and $C'(4)$ of the given example, this allows the frequency offset to be estimated without knowing the channel parameters. For example, receiver DSP may be configured to estimate the frequency offset estimation with lag-factor m (which is a positive integer from 1 to $\Delta f_{max}$, as detailed below) according to the following equation:

$$\Delta f_m' = \frac{1}{2\pi mT}\arg\left\{\sum_{i=0}^{N}C'((N+2)i+1)\right\} \quad (7)$$

If the maximum frequency offset to be estimated is known as $\Delta f_{max}$, the lag-factor is then upper bounded by: $m_{max}\leq\frac{1}{2}\Delta f_{max}T$, and the receiver DSP may produce the estimation by averaging between various or all possible m values:

$$\Delta f' = \sum_{m=1}^{m_{max}}\Delta f_m'.$$

In some embodiments, the frequency offset estimation accuracy can be enhanced by either increasing the $m_{max}$ (smaller actual frequency offset) or the preamble length K (larger pilot overhead). After frequency offset compensation, in accordance with some embodiments, the channel estimation can be easily extracted from preambles 220 and 225. The receiver DSP may subsequently use this pilot-based channel estimation in initial adaptive filter setup 280 for defining the initial filter coefficients for MIMO adaptive filtering 285 that leads to fine carrier recovery 290 and bit error rate (BER) counting 295.

In accordance with an embodiment, after adaptive filtering, the receiver DSP may fine-tune the estimate of the frequency offset between the lasers of the optical transmitter and optical receiver by measurements of the optical receiver for the distributed, e.g., equal-distanced, pilot symbols. For example, such distributed pilot symbols may be transmitted with predefined phases, and then the measurements of those phases in the optical receiver, i.e., after DSP processing, can provide better estimates of the frequency and/or phase offsets between the lasers of the optical transmitter and optical receiver. Finally, the receiver DSP can use the improved determinations of the frequency offset and the polarization-dependent optical channel matrix parameters to compensate for effects of phase noise. That is, the phase noise may be finally recovered or compensated for based on a well-known discrete cosine transform (DCT) low-pass filter model using the same distributed pilot symbols. Note that the DCT based phase noise estimation is robust to small frequency offset (tens of MHz). The phase noise recovery can be processed iteratively based on a space-alternating generalized expectation-maximization (EM) method for performance optimization.

In accordance with the embodiment, the preamble-based channel estimation can achieve rapid approximate convergence, and distributed predefined, pilot symbols, which are inserted at a defined intervals, can help to ensure the tracking of the slow variation of optical fiber channel, which communicatively connects the optical transmitter and the optical receiver. Such embodiments can avoid high complexity and long convergence times of typical multi-stage circuits, based on blind adaptive equalization, when demodulating data from symbol stream modulated according to high-order optical QAM formats. The short continuous preamble, i.e., a sequence of consecutive pilot symbols, and the distributed pilot symbols can enable the receiver DSP processing chain features such as low-complexity and fast-convergence. Such a receiver DSP may be advantageous for continuous mode, coherent optical reception of high-order QAM signals.

Illustratively, in an embodiment, a digital signal processor is configured to demodulate a transmitted data stream from digital stream of measurements of light mixtures produced in a receiver for coherent optical communications in response to receiving modulated optical carriers. The digital signal processor includes one circuit stage for providing corrections to the digital stream to compensate first effects on the light mixtures due to a frequency shift of a local optical oscillator of the optical receiver from the laser of the optical transmitter and another circuit stage for correcting the digital stream to compensate for second effects on the light mixtures due to polarization dependent channel modification of the transmitted modulated optical carriers. The circuit stages are configured to estimate initial ones of the corrections to the data stream to compensate for the first and second effects based on one or more segments of the digital stream corresponding to predefined optical pilot symbols received by the receiver. As will be appreciated, the principles of the embodiments herein are applicable to any number of common higher-order QAM configurations (e.g., at least 16, 32, 64, and/or 128, to name just a few).

Figure 3:
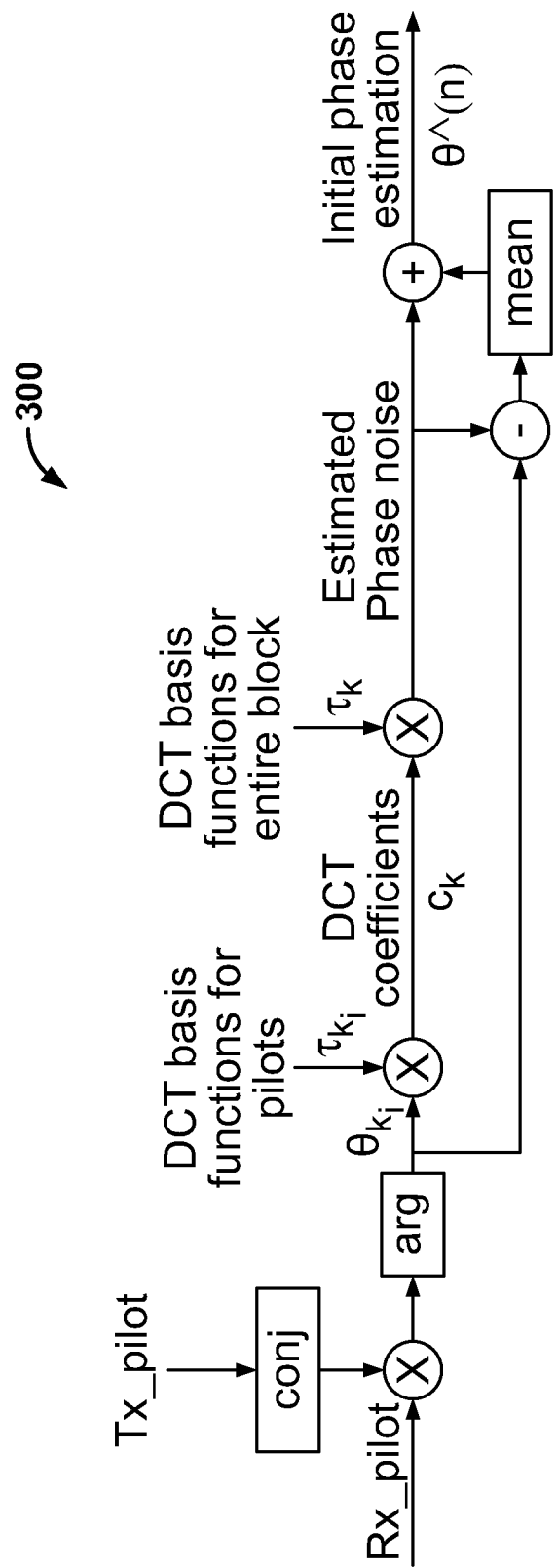
FIG. 3 shows an illustrative block diagram for pilot-aided DCT based phase noise estimation, using the DSP architecture of FIG. 2, in accordance with an embodiment.

FIG. 3 shows an illustrative block diagram 300 for pilot-aided DCT based phase noise estimation, using the DSP architecture and operations of FIG. 2 in accordance with an embodiment. As shown, after adaptive filtering, frequency offset can be fine-tuned by equally-distanced pilot symbols, and phase noise may be finally recovered based on a well-known discrete cosine transform (DCT) low-pass filter model, using the same distributed pilot symbols. The initial channel estimation is achieved using the MIMO preamble matrix based on a well-known least squares estimation, and then the adaptive filter coefficients are set accordingly, as detailed above. The optimal convergence of the adaptive filter is achieved based on a well-known multi-modulus algorithm (MMA) criteria using the distributed pilot symbols. The distributed pilot symbols are used to fine tune the frequency offset by averaging the phase difference of neighboring symbols to ultimately achieve the pilot-aided DCT based noise estimation. In this way, in the DSP of the optical receiver, the DCT based phase noise estimation can be robust to small frequency offsets (i.e., tens of MHz), and the phase noise recovery can be processed iteratively based on a space-alternating generalized expectation-maximization (EM) method for performance optimization.

Figure 4:
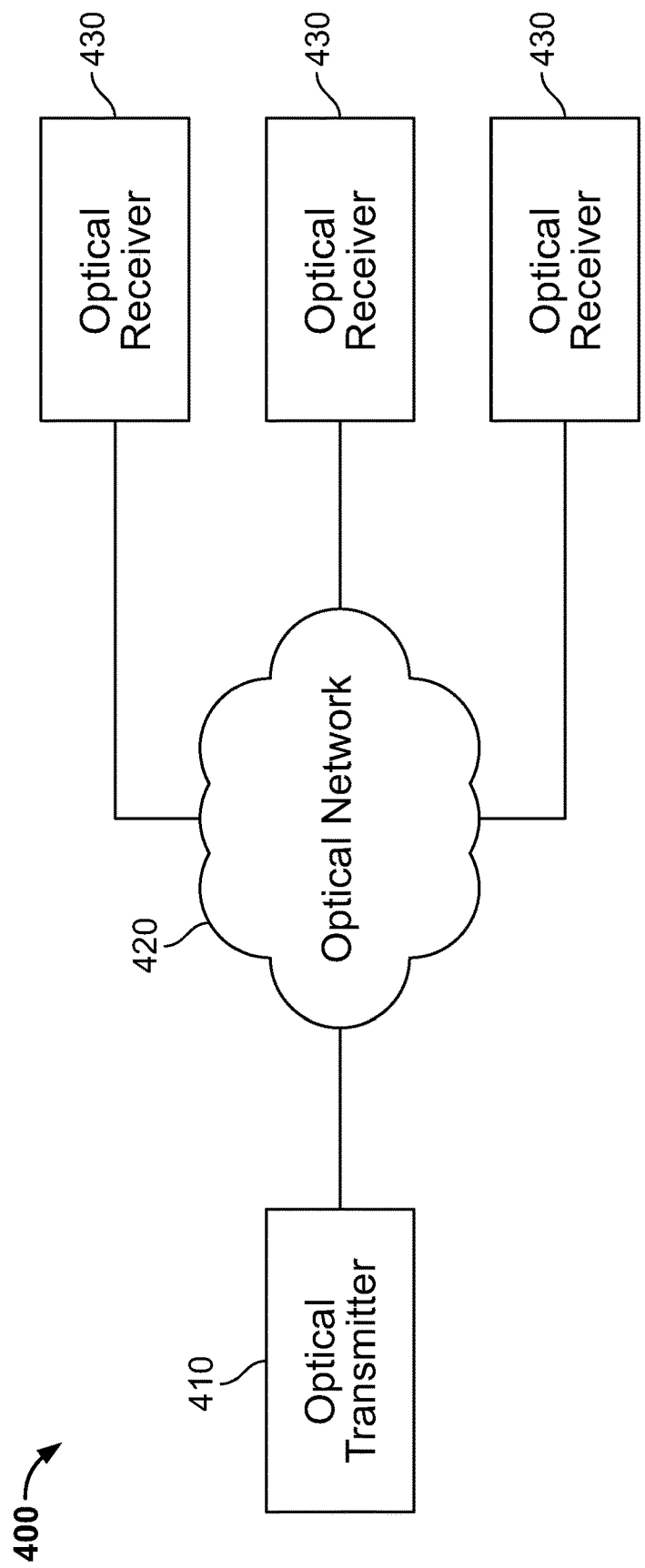
FIG. 4 shows an exemplary optical communication system using the DPS architecture of FIG. 2 in accordance with an embodiment.

FIG. 4 shows an exemplary optical communication system 400 using the DPS architecture of FIG. 2 in accordance with an embodiment. More particularly, one or more optical transmitters 410 (configured the same as transmitter 205 of FIG. 2, as detailed above) are communicatively coupled via optical network 420 with one or more optical receivers 430 (configured the same as receiver 210 of FIG. 2, as detailed above). Optical network 420 may comprise optical fibers that extend to lengths of several hundred feet (e.g., the so-called last mile drop) to several thousands of kilometers (e.g., so-called long haul networks). The transmitted optical signals may be communicated through intermediate optical equipment, in a conventional manner, such as amplifiers, repeaters, switches, etc., which are not shown in FIG. 4. High-order QAM modulation may be used across optical network 420 to sustain traffic growth and, in accordance with the embodiments herein, facilitate continuous mode coherent reception of such high-order QAM signals.

Figure 5A:
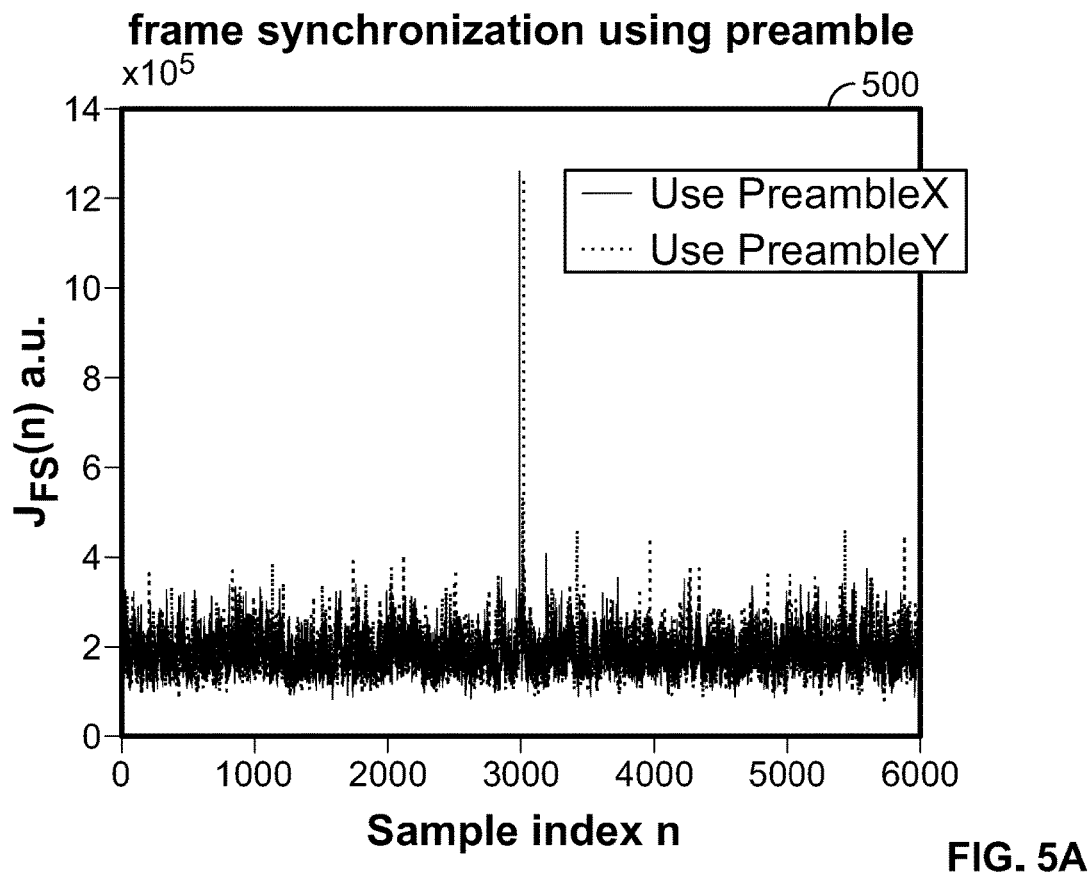
FIGS. 5A and 5B show experimental results for preamble based frame synchronization and frequency offset estimation, respectively, in accordance with an embodiment.
Figure 5B:
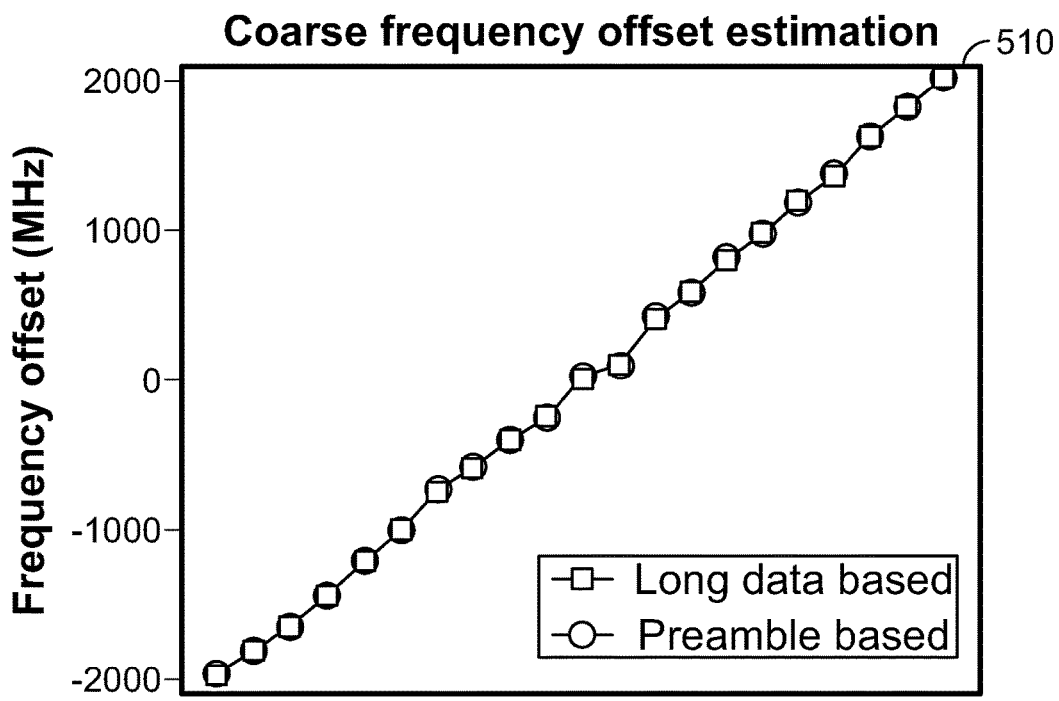
Figure 5C:
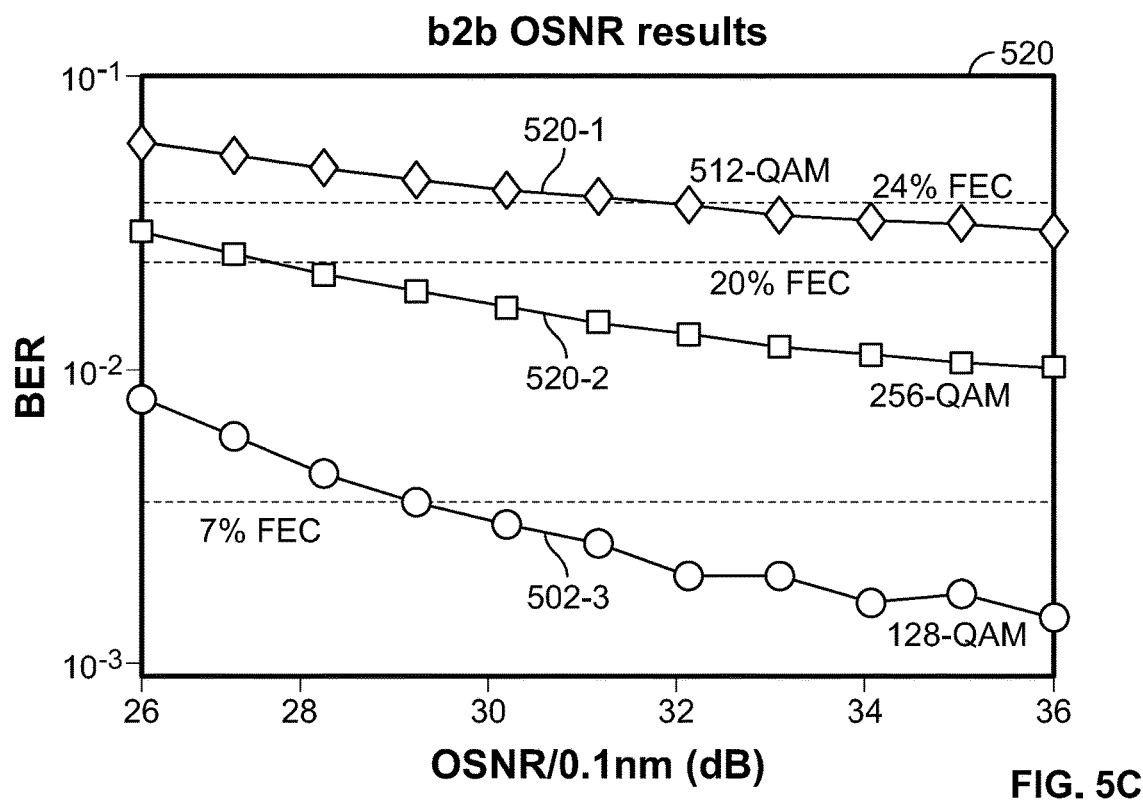
FIGS. 5C and 5D show experimental OSNR results equalized constellations, respectively, in accordance with an embodiment.
Figure 5D:
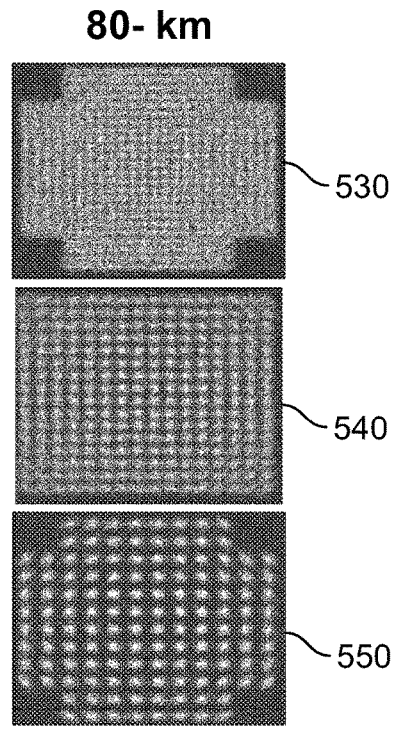

Some embodiments described herein were tested in a standard single-channel coherent optical system. In particular, FIGS. 5A and 5B show experimental results for preamble based frame synchronization 500 and frequency offset estimation 510, respectively, in accordance with an embodiment. FIGS. 5C and 5D show experimental OSNR results 520 and equalized constellations 530, 540, and 550, respectively, in accordance with the embodiment tested. Further, the results were obtained using an 80-G samples/s DAC to generate 16-G baud 128/256/512-QAM baseband signals with a 0.5 roll-off root-raised-cosine shaping filter, and digital pre-compensation was applied to offset the DAC and driver imperfections. For each sequential, non-overlapping, segment of the optical transmission stream, the pilot preamble contains a 32 symbol (K=32) Golay sequence that is designed to be non-singular over all possible m values.

In the tested illustrative embodiment, there are P=25 pilot symbols and 950 data symbols in each data frame (T=975) with the creation of a 10 ns gap by filling zeros digitally between adjacent bursts. In the optical transmitter, a LiNb dual-polarization optical I/Q modulator was driven, under the control of a transmitter DSP, by the baseband signals to modulate an integrated tunable laser assembly (ITLA) to output the PDM optical signals. The optical signals were amplified and provided to an 80-km SMF link, and ASE noise was coupled in back-to-back cases. The received signals were first filtered by an optical band-pass filter before detected by a coherent receiver integrated with transimpedance amplifier (TIA) and sampled by an 80-G samples/s real-time scope for offline processing.

The receiver DSP (e.g., receiver DSP 210) was conducted for each segment independently, with the DSP chain of operations being performed as detailed above. The signal after timing recovery was resampled to 2 samples/symbol and, except for phase noise recovery, all the subsequent DSP blocks were implemented with two over-samplings. Frame synchronization 500 is depicted with 512-QAM signals and approximately 1G frequency offset, and shows a very sharp peak at the synchronization point.

For pilot preamble-based coarse frequency offset estimation 510, the channel response length was set to 5, which is sufficient to account for DGD dominated channel delay spread. Within ±2 GHz frequency offset range, a comparison was made between the preamble-based embodiment subject and a well-known long data based method. As shown, the estimation error is within +5 MHz, and within the data frame, FO is further reduced by using the pilot symbols and finally cleaned in the phase noise estimator. The combined laser linewidth is about 250 kHz, no differential encoding and/or decoding is needed as the subject pilot-aided embodiment avoids the cycle slip issue.

Further, two EM iterations were enough to optimize the carrier recovery performance, and Bit Error Rate (BER) performance versus different OSNR values is shown in results 520 via plots 520-1, 520-2 and 520-3. As depicted, the 128-QAM signals reached a 7% FEC BER threshold of 3.8e-3 at 29-dB OSNR, the 256-QAM signals can achieve about error-free conditions at 28-dB OSNR assuming 20% FEC overhead (BER threshold 2.4e-2), and the 512-QAM signals reach a BER threshold 3.8e-2 with 24% FEC overhead at 32-dB OSNR. These threshold results correspond to about a 209, 213 and 232-Gb/s net bit rate for the 128, 256 and 512-QAM systems, respectively. In FIG. 5D, the equalized QAM constellations after an 80-km transmission are shown in QAM constellations 530, 540, and 550, respectively, which are all below associated BER thresholds.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. An apparatus, comprising:
    a digital signal processor configured to demodulate a transmitted data stream from a digital stream of measurements of light mixtures produced in a receiver for coherent optical communications in response to receiving modulated optical signals; and
    wherein the digital signal processor includes one circuit stage for providing corrections to the digital stream to compensate for first effects on the light mixtures due to a frequency shift of a local optical oscillator of the receiver and another circuit stage for providing corrections to the digital stream to compensate for second effects on the light mixtures due to polarization dependent channel modification of the modulated optical signals; and
    wherein the circuit stages are configured to estimate initial ones of the corrections to the digital stream to compensate for the first and second effects based on one or more segments of the digital stream corresponding to predefined optical pilot symbols received by the receiver.

2. An apparatus, comprising:
    a digital signal processor configured to demodulate a transmitted data stream from a digital stream of measurements of light mixtures produced in a receiver for coherent optical communications in response to receiving modulated optical signals; and
    wherein the digital signal processor includes one circuit stage for providing corrections to the digital stream to compensate for first effects on the light mixtures due to a frequency shift of a local optical oscillator of the receiver and another circuit stage for providing corrections to the digital stream to compensate for second effects on the light mixtures due to polarization dependent channel modification of the modulated optical signals; and
    wherein the circuit stages are configured to estimate initial ones of the corrections to the digital stream to compensate for the first and second effects based on one or more segments of the digital stream corresponding to predefined optical pilot symbols received by the receiver; and
    wherein the circuit stages are configured to estimate further of the corrections to compensate the first effects to compensate based on disjoint segments of the digital stream corresponding to other optical pilot symbols of predefined phase received by the receiver.

3. The apparatus of claim 1, further comprising the receiver for coherent optical communications, the receiver including the digital signal processor and the local optical oscillator; and
    wherein the receiver is configured to demodulate a data stream from portions of the received modulated optical signals whose polarization components have been modulated according to optical QAM constellations with at least 16 symbol points.

4. The apparatus of claim 3, wherein at least one of the optical QAM constellations has at least 64 symbol points.

5. The apparatus of claim 3, wherein at least one of the optical QAM constellations has at least 128 symbol points.

6. The apparatus of claim 1, further comprising a transceiver for coherent optical communications, the transceiver including a transmitter for coherent optical communication and the receiver; and
    wherein the receiver includes the digital signal processor and the local optical oscillator; and wherein the transmitter is configured to transmit optical signals modulated to carry data according to a phase modulation scheme.

7. The apparatus of claim 6, wherein the receiver is configured to demodulate a data stream from portions of the received modulated optical signals whose polarization components have been modulated according to optical QAM constellations with at least 16 symbol points.

8. The apparatus of claim 7, wherein at least one of the optical QAM constellations has at least 64 symbol points.

9. The apparatus of claim 7, wherein at least one of the optical QAM constellations has at least 128 symbol points.

10. An apparatus, comprising:
a transceiver for coherent optical communications, the transceiver including a transmitter and a receiver, wherein the transmitter is configured to transmit optical signals modulated to carry data according to a phase modulation scheme, and wherein the receiver includes a digital signal processor and a local optical oscillator; and
wherein the digital signal processor is configured to demodulate a transmitted data stream from a digital stream of measurements of light mixtures produced in the receiver in response to receiving the modulated optical signals;
wherein the digital signal processor includes one circuit stage for providing corrections to the digital stream to compensate for first effects on the light mixtures due to a frequency shift of the local optical oscillator and another circuit stage for providing corrections to the digital stream to compensate for second effects on the light mixtures due to polarization dependent channel modification of the modulated optical signals; and
wherein the circuit stages are configured to estimate initial ones of the corrections to the digital stream to compensate for the first and second effects based on one or more segments of the digital stream corresponding to predefined optical pilot symbols received by the receiver; and
wherein the circuit stages are configured to estimate further of the corrections to compensate the first effects to compensate based on disjoint segments of the digital stream corresponding to other optical pilot symbols of predefined phase received by the receiver; and
wherein the receiver is configured to demodulate a data stream from portions of the received modulated optical signals whose polarization components have been modulated according to optical QAM constellations with at least 16 symbol points.

11. The apparatus of claim 6, wherein the transceiver is configured to transmit an optical signal modulated according to a QAM constellation with at least 16 symbol points and is configured to transmit pilot symbols as interspersed optical pilot symbols of predefined phase between segments of the transmitted modulated optical signal.

12. The apparatus of claim 10, wherein the transceiver is configured to transmit an optical signal modulated according to a QAM constellation and is configured to transmit pilot symbols as interspersed optical pilot symbols of predefined phase between segments of the transmitted modulated optical signal.

13. The apparatus of claim 10, wherein the predefined optical pilot symbols comprise:
one or more pilot preamble symbol sequences; and
a plurality of individual pilot symbols distributed with payload data in one or more data frames.

14. The apparatus of claim 2, wherein the predefined optical pilot symbols comprise:
one or more pilot preamble symbol sequences; and
a plurality of individual pilot symbols distributed with payload data in one or more data frames.

15. The apparatus of claim 2, further comprising the receiver for coherent optical communications, the receiver including the digital signal processor and the local optical oscillator; and
wherein the receiver is configured to demodulate a data stream from portions of the received modulated optical signals whose polarization components have been modulated according to optical QAM constellations with at least 16 symbol points.

16. The apparatus of claim 15, wherein at least one of the optical QAM constellations has at least 64 symbol points.

17. The apparatus of claim 15, wherein at least one of the optical QAM constellations has at least 128 symbol points.

18. The apparatus of claim 1, wherein the predefined optical pilot symbols comprise:
one or more pilot preamble symbol sequences; and
a plurality of individual pilot symbols distributed with payload data in one or more data frames.

19. The apparatus of claim 18, wherein the one or more pilot preamble symbol sequences each comprise a 32-symbol sequence.

20. The apparatus of claim 18, wherein the one or more data frames comprise Z total symbols including P individual pilot symbols distributed therein, and wherein a ratio Z/P is equal to 2L+1, where L is an integer.

* * * * *